UNITED STATES PATENT OFFICE 3,657,261
Patented Apr. 18, 1972

3,657,261
AZIDOISOTHIAZOLES
Alfred Joos and Walter Wirtz, Darmstadt, Germany, assignors to Merck Patent Gesellschaft mit beschrankter Haftung, Darmstadt, Germany
No Drawing. Filed Jan. 27, 1970, Ser. No. 6,317
Claims priority, application Germany, Jan. 29, 1969,
P 19 04 241.2
Int. Cl. C07d 91/12
U.S. Cl. 260—302 S    22 Claims

ABSTRACT OF THE DISCLOSURE

Azidoisothiazoles of the formula

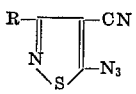

wherein R is halogen or $SR_1$, $SOR_1$ or $SO_2R_1$ in which $R_1$ is alkyl or benzyl or phenethyl unsubstituted or substituted with $NO_2$ and/or halogen are insect repellents and also have antibacterial and antimycotic activity.

BACKGROUND OF THE INVENTION

This invention relates to azidoisothiazoles, more particularly to 3-substituted-5-azido-isothiazole-4-carbonitriles, to compositions comprising them adapted for use as insect repellents, antibacterials and/or antimycotis, and to processes for their production.

SUMMARY OF THE INVENTION

The azidoisothiazoles of this invention have the formula

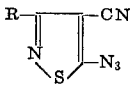 (I)

wherein R is halogen, $SR_1$, $SOR_1$ or $SO_2R_1$, in which $R_1$ is straight-chain or branched alkyl of up to 12 carbon atoms, or benzyl or phenylethyl unsubstituted or substituted on the benzene ring by $NO_2$ and/or halogen, are excellent insect repellents and also possess good antibacterial and antimycotic properties.

OBJECTS OF THE INVENTION

It is an object of this invention to provide novel azidoisothiazoles of Formula I. Another object is the provision of processes for the preparation thereof. A further object is the provisions of compositions embodying them. Still another object is the provision of methods for the utilization of azidoisothiazoles of Formula I as insect repellent and antimicrobial agents. Other objects will be apparent to those skilled in the art to which this invention pertains.

DETAILED DESCRIPTION OF THE INVENTION

The compounds of this invention all possess a substituent at the 3-position, i.e., R as defined hereinabove. When R in the compounds of Formula I is an $R_1$-substituted mercapto, sulfinyl, or sulfonyl group, especially suitable $R_1$ groups are methyl, ethyl, n-propyl, isopropyl, 1- or 2-n-butyl, isobutyl, tert.-butyl n-amyl, isoamyl, hexyl, heptyl, octyl, as well as the isomers of these residues and the higher homologs thereof, containing up to 12 carbon atoms.

When $R_1$ is an aralkyl group, such groups of special importance are benzyl and 1- and 2-phenylethyl and the corresponding groups mono or polysubstituted with halogen and/or nitro, e.g., 4-nitrobenzyl, 2,4-dinitrobenzyl, 4-fluorobenzyl, 2-, 3- and 4-chlorobenzyl, 2-(4-chlorophenyl)-ethyl, 2,4-, 3,4- and 2,6-dichlorobenzyl and 4-bromobenzyl.

Of the compounds of Formula I in which R is a halogen atom, 3-chloro- and 3-bromo-5-azidoisothiazole-4-carbonitrile are preferred. However, R can also be iodine or fluorine.

Of the compounds of this invention, particularly preferred are those wherein R is chlorine or alkyl-S- containing from 1–3 carbon atoms.

The azidoisothiazoles of this invention can be prepared from the corresponding isothiazole-4-carbonitriles of the formula

 (II)

wherein Y is halogen, preferably chlorine or bromine, or a diazonium cation, by reaction of the latter with a metallic azide, preferably sodium azide or potassium azide. The reaction conditions conventional for such nucleophilic substitutions on heterocyclic compounds are employed. Particularly advantageous for this reaction are the polar solvents, such as, for example, water, lower aliphatic alcohols, in particular, methanol and ethanol, dimethylformamide, dimethyl sulfoxide, ketones, such as, for example, acetone, cyclic ethers, e.g., dioxane and tetrahydrofuran, or mixtures of these solvents.

The reaction temperature should not exceed 50° C. and preferably the reaction is conducted between 0 and 35° C.

The starting compounds of Formula II wherein a diazonium cation is present in the 5-position in place of the $N_3$-group of the compounds of Formula I are obtainable in accordance with standard processes from the corresponding 5-amino compounds by reaction with nitrous acid. During the subsequent reaction of the diazonium salts (preferably sulfates or chlorides) with the metallic azide, $N_2$ is liberated in a conventional manner.

The 3-R-5-azidoisothiazole-4-carbonitriles of this invention can also be produced by diazotizing the corresponding 3-R-5-hydrazinoisothiazole - 4 - carbonitriles, i.e. a compound otherwise corresponding to Formula II wherein Y is a hydrazino group, in a conventional manner in an acidic solution. As is well known, the diazotizing process involves the reaction of amino compounds with nitrous acid in an acidic solution. As is also known, azides are formed during this reaction from hydrazines. The reaction conditions are well known from the literature.

The starting 3-R-5-hydrazinoisothiazole-4-carbonitriles can be produced especially advantageously by reacting the corresponding compounds containing, in the 5-position, instead of the hydrazino group, a group replaceable by the hydrazine groups by reaction with hydrazine. Groups which can be replaced by the hydrazine group are, for example, halogen, $NO_2$, $NH_2$, $SR_1$, $SOR_1$, $SO_2R_1$, $OSO_2H$, $OSO_2R_1$, a sulfonyloxy group e.g., $$p\text{-}OSO_2C_6H_4CH_3$$

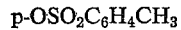

$p\text{-}OSO_2C_6H_4Br$ or a carbonyloxy group of the formula $OCOR_1$, wherein $R_1$ in each instance has the meanings given above. In this reaction, hydrazine is preferably employed in the form of 80% hydrazine hydrate. The substituent in the 5-position of the isothiazole ring is exchanged for the hydrazino group almost exclusively and in a surprisingly smooth reaction. Such reactions have not heretofore been known in connection with isothiazole derivatives.

The diazotization preferably is conducted at temperatures not substantially exceeding the room temperature. Suitable acids for the reaction, in addition to mineral acids, e.g., hydrochloric acid, are the lower aliphatic carboxylic acids, e.g., acetic acid.

The insect repellent effect of the compounds of this invention was demonstrated with the yellow-fever mosquito (*Aedes aegypti L.*), in vitro as well as in vivo.

In the in vitro test, the compounds to be tested were dissolved in acetone at various concentrations, and paper filters (diameter: 9 cm.) were saturated with these solutions and the acetone evaporated. The thus-treated and dried circular filters were suspended on strings 15 cm. long in the center of 30-liter glass jars. In two control vessels, untreated paper filters of the same size were suspended. Then, about 150 yellow-fever mosquitoes were introduced into each glass jar. In the control vessels with the untreated filters, 40-50 mosquitoes (about 30%) chose the filters as their resting place. The filters saturated with an effective substance were partially or completely avoided by the insects, depending on the effectiveness and dosage of the particular substance. By counting the mosquitoes on the treated filters, the $RD_{80}$ ("repellent dosage 80%") was determined, i.e., the dosage (in mg./100 cm.$^2$) at which 80% of the mosquitoes which otherwise would have alighted on the filters (32-40) avoid the treated filters.

As the comparison substance, the conventional insect repellent N,N-diethyl-m-toluamide was employed. The results are shown in Table I.

TABLE I

Insect repellent effect of azidoisothiazoles

| Effective agent: | $RD_{80}$ (mg./100 cm.$^2$) |
|---|---|
| 3-chloro-5-azidoisothiazole-4-carbonitrile | 0.07 |
| 3-methylthio-5-azidoisothiazole-4-carbonitrile | 0.10 |
| 3-ethylthio-5-azidoisothiazole-4-carbonitrile | 0.38 |
| 3 - n - propylthio-5-azidoisothiazole-4-carbonitrile | 0.40 |
| 3-isopropylthio-5-azidoisothiazole-4-carbonitrile | 0.13 |
| N,N-diethyl-m-toluamide | 0.57 |

It can be seen from Table I that the effectiveness of the compounds of this invention is 1.5 to 8 times greater than that of the comparison substance N,N-diethyl-m-toluamide, which latter compound is presently the leading effective agent is commercial insect repellent preparations.

In the in vivo test, solutions of the effective agents of identical concentrations of 30 mg./ml. were applied to 20 cm.$^2$ of the skin of the forearm of the persons submitting to the test. To one forearm was applied a solution of one of the compounds of this invention and to the other forearm was applied a solution of the comparison compound, N,N-diethyl-m-toluamide. The treated area was defined by arm cuffs. The arms were then introduced separately into stinging cages each containing about 1,000 female mosquitoes which were avid to sting. Then the time periods which passed until three stings, respectively, were received on each forearm were determined. The thus-determined protection times of the compounds of this invention were compared with those of N,N-diethyl-m-toluamide in connection with the same person. Table II sets forth the average protective time relationships, i.e., the time required to receive three stings on the forearm treated with the test compound divided by the time required to receive three stings on the forearm treated with N,N-diethyl-m-toluamide.

TABLE II

| Protective agent | Protective time relationship |
|---|---|
| 3-chloro-5-azidoisothiazole-4-carbonitrile | 2 |
| 3-methylthio-5-azidoisothiazole-4-carbonitrile | 2.5 |
| 3-ethylthio-5-azidoisothiazole-4-carbonitrile | 2.5 |
| 3-n-propylthio-5-azidoisothiazole-4-carbonitrile | 1.5 |
| 3-isopropylthio-5-azidoisothiazole-4-carbonitrile | 1.4 |
| N,N-diethyl-m-toluamide | 1 |

Table II shows clearly the superiority as insect repellents of the compounds of this invention over the reference compound.

The compounds of this invention also exhibit excellent antimicrobial properties. In addition to having a broad antibacterial spectrum against both gram-positive and gram-negative bacteria, these compounds also exhibit antimycotic effects, i.e. they are effective against mycobacteria and fungi. Because of these properties, the compounds of this invention are excellently suited for the treatment of skin disorders. The extremely broad spectrum of their effectiveness creates a wide field of application.

The antibacterial effect can be determined by the tube dilution test and the agar dilution test in accordance with standard methods. In this connection, the minimum inhibitory concentrations are determined with respect to characteristic representatives of the most important bacterial groups. In the agar dilution test, the test substances are added to the agar medium inoculated with test germs in staggered concentrations. Incubating takes place at 37° C. and inhibition determination is conducted after 24 hours. In the tube dilution test, incubation is likewise carried out at 37° C., but inhibition determination is made after 18 hours. In each case, bacteria whose growth are difficult to influence, e.g., pyocyaneous and proteus bacteria, as well as Klebsiellae, Enterococci, and penicillin-resistant staphylococci, were included in the tests.

The antimycotic testing was conducted by the agar dilution test against various dermatophytes, yeast fungi and mold fungi. Here, too, the test substances are added to the agar medium in stagger concentrations. Incubation is conducted at 25° C. and inhibition evaluation takes place after 15 days. The minimum inhibitory concentration is being determined in this test as well.

The compounds of this invention can be formulated in combination with most of the carriers and/or auxiliary agents customary for the desired type of application, e.g., environmental or topical insecticides, bacteriocides and fungicides. When selecting the additives, the only factor to be kept in mind is the reactive character of the compounds of this invention as organic azides. For this reason, it is desirable to weaken strongly basic or strongly acidic additives with buffers. Also, when formulating the effective agents, elevated temperatures should be avoided as much as possible.

In order to employ the compounds of this invention as insect repellents, they can be processed into cosmetic as well as technical preparations. The content of effective agent in such preparations generally ranges between 0.2 and 70%, preferably between 0.5 and 40%. It is, of course, also possible to combine the novel effective agents with conventional insect repellents, if desired. Suitable cosmetic preparations are, in particular, emulsions, salves, sprays, or insect repellent sticks. Suitable additives in this connection are those conventionally employed in the manufacture of cosmetics. Solvents which can be used are, for example, water, ethanol, isopropanol, propylene glycol, glycerin, dichloromethane, and acetone. Suitable carriers and/or fillers that can be employed are paraffin hydrocarbons, e.g. highly viscous paraffin oil, Vaseline petroleum jelly and solid paraffin; fatty alcohols, e.g., cetyl alcohol, stearyl alcohol, and cetylstearyl alcohol; Fatty oils; glycerol-mono, -di-, and -tri-fatty acid esters which, depending on their constitution and degree of substitution, are solids, salve-like semi-solids, or liquids, other fatty acid esters, e.g., propylene glycol monostearate; natural and partially synthetic substances, e.g., stearin, ceresin, beeswax, and spermaceti; cold swelling agents, e.g., aluminum stearate; thickeners, e.g., cellulose ether and collodion cotton.

Suitable emulsifiers are anionic emulsifiers, e.g., sodium cetylstearyl sulfate, sodium lauryl sulfate, and alkaline soaps of higher fatty acids, and nonionic emulsifiers, e.g. cholesterol, cholestanol, wool wax alcohol, fatty acid ethers and esters, as well as polyoxyethylated products.

For industrial purposes, the novel compounds can be employed in paints, in polishing, cleansing, or cleaning agents, as well as in impregnating agents for textile fibers films, or packaging materials, at a concentration of about 0.2–20%, preferably 0.5–10%. For this purpose, bearing in mind the reactivity of the azide group of the novel compounds, customary base materials, fillers and additives can be employed.

When using the compounds of this invention as antimicrobial agents, topical preparations are preferred, e.g., creams, salves, powders, lotions, and emulsions. Here again, the conventional carriers and auxiliary agents can be employed which exhibit satisfactory compatibility with the skin. Examples are the vegetable oils, benzyl alcohols, polyethylene glycols, gelatin, lactose, amylose, magnesium stearate, talc, Vaseline. The preparations can be sterilized and mixed with auxiliary substances, e.g., lubricants, preservatives, stabilizers, or wetting agents, emulsifiers, salts for influencing the osmotic pressure, buffers, as well as coloring and/or aromatous substances.

The novel agents, containing the effective compounds in concentrations of 0.05 to 5% by weight, are utilized in a conventional manner in case of all situations wherein undesired bacterial and/or mycotic growth or diseases are present or to be expected, e.g., in mammals, for example, pyodermias, follicular diseases, infected wounds and burns, inflammatory and allergic dermatoses. The preparations are preferably employed topically, e.g., applied several times daily in a thin layer to the diseased areas of the skin. The frequency of application depends on the type and seriousness of the affliction.

The physical form of the antimicrobial agents according to the invention, except that of the powder preparations, is viscous (higher than the viscosity of water) to semi-solid. In the case of creams, salves, emulsions and lotions, the carriers, fillers and/or emulsifiers listed above as suitable ingredients for the preparation of cosmetic insect repellent agents, can be used for the preparation of said antimicrobial agents, too. Suitable preservatives are conventional substances, such as p-hydroxy-benzoate, e.g. methylparaben, ethylparaben, propylparaben, and butylparaben, sorbic acid, organic mercury compounds, such as phenylmercuric borate and phenylmercuric nitrate. Moreover, the addition of perfume oils is also possible.

In the case of powder preparations, the most suitable carriers are talc, lactose, potato starch, rice starch, zinc oxide, bolus, calcium carbonate, magnesium stearate, and titanium dioxide.

If these antimicrobial preparations are to be sterilized by heat, such sterilization should take place before adding the active ingredient of Formula I.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all degrees given are in degrees centigrade.

(A) PREPARATION OF THE AZIDOISOTHIAZOLES

Example 1

A solution of 26.0 g. of sodium azide in 80 ml. of water is added dropwise under agitation and cooling to a solution of 71.6 g. of 3,5-dichloroisothiazole-4-carbonitrile in 400 ml. of dimethylformamide, in such a manner that the temperature of the reaction mixture does not rise above 40° C. Then, the reaction solution is cooled to 0° C., stirred for one-half hour, stirred into 400 ml. of ice water, and the thus-precipitated product is vacuum-filtered. After recrystallization from ethanol, the thus-obtained 3-chloro-5-azidoisothiazole-4-carbonitrile melts at 86–88° C. with decomposition.

Analogously, the following compound is obtained: 3-bromo-5-azidoisothiazole-4-carbonitrile; light-yellow crystals, decomposition from 62° C.

Example 2

(a) 404 g. of 3,5-di(methylthio)-isothiazole-4-carbonitrile is boiled under reflux in 3.5 l. of ethanol with 260 g. of 80% hydrazine hydrate for 6 hours, and then allowed to stand overnight. Thereafter, any crystallized, unreacted starting material is vacuum-filtered, and the filtrate is stirred into 20 l. of water. The thus-precipitating crystalline product is vacuum-filtered, dried, suspended in 500 ml. of benzene, and again vacuum-filtered, thus obtaining pure 3-methylthio-5-hydrozinoisothiazole-4-carbonitrile, M.P. 171–173° C.

61 g. of 3-mehylthio-5-hydrazinoisothiazole-4-carbonitrile is suspended in 500 ml. of glacial acetic acid. With stirring and cooling with ice water, a solution of 27.2 g. of sodium nitrate in 120 ml. of water is added dropwise in such a manner that the temperature remains between 20 and 23° C. Thereafter, the reaction solution is agitated for 15 minutes, poured into 500 ml. of ice water, and the thus-precipitated substance is vacuum-filtered. The thus obtained 3-methylthio-5-azidoisothiazole-4-carbonitrile is recrystallized from isopropanol; M.P. 98–100° C.

Analogously, the following compounds are obtained:

3-methylsulfonyl-5-azidoisothiazole-4-carbonitrile, M.P. 128–130° C.;
3-methylsulfinyl-5-azidoisothiazole-4-carbonitrile, M.P. 108–114° C.;
3-ethylthio-5-azidoisothiazole-4-carbonitrile, M.P. 54–56° C.;
3-ethylsulfonyl-5-azidoisothiazole-4-carbonitrile, decomposition from 95° C.;
3-n-propylthio-5-azidoisothiazole-4-carbonitrile, M.P. 28–30° C.;
3-n-propylsulfonyl-5-azidoisothiazole-4-carbonitrile, decomposition from 91° C.;
3-isopropylthio-5-azidoisothiazole-4-carbonitrile, M.P. 60–62° C. ;
3-isopropylsulfonyl-5-azidoisothiazole-4-carbonitrile, decomposition from 102° C.
3-n-amylthio-5-azidoisothiazole-4-carbonitrile, yellow oil, nondistillable;
3-n-hexylthio-5-azidoisothiazole-4-carbonitrile, yellow oil, nondistillable;
3-n-octylthio-5-azidoisothiazole-4-carbonitrile, yellow oil, nondistillable;
3-n-dodecylthio-5-azidoisothiazole-4-carbonitrile, yellow oil, nondistillable;
3-benzylthio-5-azidoisothiazole-4-carbonitrile, M.P. 94–95° C.;
3-(2-phenylethylthio)-5-azidoisothiazole-4-carbonitrile;
3-(2-chlorobenzylthio)-5-azidoisothiazole-4-carbonitrile, M.P. 94–95° C.;
3-(4-chlorobenzylthio)-5-azidoisothiazole-4-carbonitrile, M.P. 64–67° C.;
3-(3,4-dichlorobenzylthio)-5-azidoisothiazole-4-carbonitrile, M.P. 84–86° C.;
3-(4-nitrobenzylthio)-5-azidoisothiazole-4-carbonitrile, decomposition, 97–104° C.;

(b) 32 g. of 5-amino-3-chloroisothiazole-4-carbonitrile is stirred into a mixture of 200 ml. of glacial acetic acid and 20 ml. of concentrated $H_2SO_4$, and diazotized with a solution of 14 g. of $NaNO_2$ in 40 ml. of water. After 15 minutes, a solution of 14 g. of $NaN_3$ in 30 ml. of water is added to the ice-cold solution. After several hours of agitation, the evolution of nitrogen has ceased. The reaction mixture is extracted several times with ether. The ether phase is washed with a solution of bicarbonate and water. After drying with $Na_2SO_4$, the ether is evaporated under a vacuum, and the residue is recrystallized from isopropanol, thus obtaining 3-chloro-5-azidoisothiazole-4-carbonitrile, M.P. 87° C. (decomposition).

(B) FORMULATIONS FOR INSECT REPELLANTS

The percentages set forth below are percent by weight.

Example 3.—Spray liquid

| | Percent |
|---|---|
| 3-chloro-5-azidoisothiazole-4-carbonitrile | 5 |
| Isopropanol | 95 |

Example 4.—Insect repellent salve

| | Percent |
|---|---|
| 3-methylthio-5-azidoisothiazole-4-carbonitrile | 4 |
| Aqueous methylcellulose solution (3%) | 71 |
| Polyethylene glycol ester of alkylcarboxylic acid | 25 |

Example 5.—Insect repellant spray

| | Percent |
|---|---|
| 3-ethylthio-5-azidoisothiazole-4-carbonitrile | 5.0 |
| Highly viscous collodion cotton | 0.5 |
| Aromatous substance | 0.5 |
| Dichloromethane | 94.0 |

An aerosol spray can is filled with this solution together with the same amount of a propellant gas of 50.0% of dichlorodifluoromethane, 25.0% of trichlorofluoromethane, and 25.0% of an industrial propane-butane mixture (liquefied gas).

Example 6.—Insect repellent varnish

| | Percent |
|---|---|
| Alkyl phenol-formaldehyde resin | 35.0 |
| Linseed oil | 14.0 |
| Wood oil | 14.0 |
| Siccative | 1.2 |
| 3-(3,4-dichlorobenzylthio) - 5 - azidoisothiazole-4-carbonitrile | 2.0 |
| Mineral spirits | 33.8 |

Example 7.—Insect repellent wall paint

| | Percent |
|---|---|
| Polyvinyl acetate dispersion (50%, free of plasticizer) | 20.0 |
| Polyvinyl acetate dispersion (50%, with plasticizer) | 6.0 |
| 3-chloro-5-azidoisothiazole-4-carbonitrile | 3.0 |
| Ethanol | 7.0 |
| Chalk | 35.0 |
| Titanium dioxide | 5.0 |
| Aqueous methylcellulose solution (4%) | 2.0 |
| Water | 22.0 |

(C) FORMULATIONS FOR ANTIMICROBIAL AGENTS

Example 8.—Powder

Sterilized lactose is mixed with pulverized 3-chloro-5-azidoisothiazole-4-carbonitrile to form a 0.25% preparation.

Example 9.—Cream

| | Percent |
|---|---|
| 3-chloro-5-azidoisothiazole-4-carbonitrile | 0.3 |
| Cetyl alcohol | 9.0 |
| Highly viscous paraffin oil | 3.0 |
| Glycerol monostearate | 2.0 |
| Propylene glycol monostearate | 2.0 |
| Glycerin | 2.0 |
| Finely divided silicic acid | 0.1 |
| Vaseline | 9.5 |
| Polyoxyethylene sorbitan monopalmitate | 30.0 |
| Methyl p-hydroxybenzoate | 0.07 |
| Propyl p-hydroxybenzoate | 0.03 |
| Propylene glycol | 3.0 |
| Water | 39.0 |

Example 10.—Salve

| | Percent |
|---|---|
| 3-chloro-5-azidoisothiazole-4-carbonitrile | 0.25 |
| Cetyl alcohol | 3.0 |
| Anhydrous lanolin | 1.0 |
| Highly viscous paraffin oil | 15.0 |
| White Vaseline | 81.0 |

Example 11.—Cream

| | Percent |
|---|---|
| 3-methylthio-5-azidoisothiazole-4-carbonitrile | 0.5 |
| Mixture of cetyl and octadecyl alcohol | 9.0 |
| White Vaseline | 32.0 |
| Highly viscous paraffin oil | 3.0 |
| Neutral, low-viscosity vegetable oil (triglyceride mixture | 2.0 |
| Polyoxyethylene sorbitan monopalmitate | 6.0 |
| Glycerol monostearate | 3.0 |
| Sorbic acid | 0.2 |
| Perfume oil | 0.01 |
| Pulverized silicic acid | 0.25 |
| Glycerin | 5.0 |
| Water | 39.0 |

Example 12.—Lotion

| | Percent |
|---|---|
| 3-chloro-5-azidoisothiazole-4-carbonitrile | 0.3 |
| Highly viscous paraffin oil | 10.0 |
| Ethanol | 2.0 |
| Glycerin | 1.0 |
| Propylene glycol | 2.0 |
| Sorbic acid | 0.15 |
| Fatty alcohol polyglycol ether | 2.0 |
| Mixture of cetylstearyl alcohol, sodium cetylstearyl sulfate, and nonionic emulsifier | 5.0 |
| Perfume oil | 0.01 |
| Water | 82.0 |

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Azidoisothiazoles of the formula

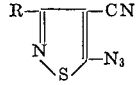

wherein R is a member of the group consisting of halogen, $SR_1$, $SOR_1$ and $SO_2R_1$ in which $R_1$ is a member of the group consisting of alkyl containing up to 12 carbon atoms, benzyl, phenylethyl and the corresponding groups substituted on the benzene ring by one or both of $NO_2$ and halogen.

2. The compound of claim 1, 3-chloro-5-azidoisothiazole-4-carbonitrile.

3. The compound of claim 1, 3-bromo-5-azidoisothiazole-4-carbonitrile.

4. The compound of claim 1, 3-methylthio-5-azidoisothiazole-4-carbonitrile.

5. The compound of claim 1, 3-methylsulfinyl-5-azidoisothiazole-4-carbonitrile.

6. The compound of claim 1, 3-methylsulfonyl-5-azidoisothiazole-4-carbonitrile.

7. The compound of claim 1, 3 - ethylthio-5-azidoisothiazole-4-carbonitrile.

8. The compound of claim 1, 3-ethylsulfonyl-5-azidoisothiazole-4-carbonitrile.

9. The compound of claim 1, 3-n-propylthio-5-azido-isothiazole-4-carbonitrile.

10. The compound of claim 1, 3-n-propylsulfonyl-5-azidoisothiazole-4-carbonitrile.

11. The compound of claim 1, 3-isopropylthio-5-azidoisothiazole-4-carbonitrile.

12. The compound of claim 1, 3-isopropylsulfonyl-5-azidoisothiazole-4-carbonitrile.

13. The compound of claim 1, 3-n-amylthio-5-azidoisothiazole-4-carbonitrile.

14. The compound of claim 1, 3-n-hexylthio-5-azidoisothiazole-4-carbonitrile.

15. The compound of claim 1, 3-n-octylthio-5-azidoisothiazole-4-carbonitrile.

16. The compound of claim 1, 3-n-dodecylthio-5-azidoisothiazole-4-carbonitrile.

17. The compound of claim 1, 3-benzylthio-5-azidoisothiazole-4-carbonitrile.

18. The compound of claim 1, 3-(2-phenylethylthio)-5-azidoisothiazole-4-carbonitrile.

19. The compound of claim 1, 3-(2-chlorobenzylthio)-5-azidoisothiazole-4-carbonitrile.

20. The compound of claim 1, 3-(4-chlorobenzylthio)-5-azidoisothiazole-4-carbonitrile.

21. The compound of claim 1, 3-(3,4-dichlorobenzylthio)-5-azidoisothiazole-4-carbonitrile.

22. The compound of claim 1, 3-(4-nitrobenzylthio)-5-azidoisothiazole-4-carbonitrile.

References Cited
UNITED STATES PATENTS

| | | | |
|---|---|---|---|
| 3,155,678 | 11/1964 | Hatcharp | 260—302 S |
| 3,479,365 | 11/1969 | Naito et al. | 260—302 A |

ALEX MAZEL, Primary Examiner

R. J. GALLAGHER, Assistant Examiner

U.S. Cl. X.R.

260—302 A; 424—270